United States Patent
Ramos Júnior et al.

(10) Patent No.: US 6,221,515 B1
(45) Date of Patent: Apr. 24, 2001

(54) BIMETALLIC STRIP FOR A SLIDING BEARING AND PROCESS FOR PRODUCING SAID BIMETALLIC STRIP

(75) Inventors: Joaquim de Oliveira Ramos Júnior; Denys da Cuhna Flores; Carlos Henrique Gaspar dos Santos, all of São Paulos (BR)

(73) Assignee: Metal Leve S/A Industria E Comercio, Sao Paulo (BR)

( * ) Notice: Subject to any disclaimer, the term of this patent is extended or adjusted under 35 U.S.C. 154(b) by 0 days.

(21) Appl. No.: 08/817,967

(22) PCT Filed: Jul. 28, 1995

(86) PCT No.: PCT/BR95/00034

§ 371 Date: Aug. 13, 1999

§ 102(e) Date: Aug. 13, 1999

(87) PCT Pub. No.: WO96/11800

PCT Pub. Date: Apr. 25, 1996

(30) Foreign Application Priority Data

Oct. 13, 1994 (BR) ..................................................... 9403710

(51) Int. Cl.⁷ ............................... B32B 15/01; C22F 1/04

(52) U.S. Cl. .................. 428/653; 29/898.12; 29/898.14; 148/415; 148/437; 148/902; 148/531; 148/523; 148/535; 148/551; 148/552; 148/691; 148/692; 148/693; 148/694; 148/698; 148/699; 428/652; 428/654; 428/636; 428/637

(58) Field of Search ..................................... 428/652, 653, 428/654, 636, 637; 420/528, 530, 537, 548, 553; 148/415, 437, 902, 531, 523, 535, 551, 552, 691, 692, 693, 694, 698, 699; 164/461, 98; 384/912; 29/898.12, 898.14; 228/235.8

(56) References Cited

U.S. PATENT DOCUMENTS 2,790,216  4/1957  Hunter ................................. 164/428

(List continued on next page.)

FOREIGN PATENT DOCUMENTS

| 36 31 029 | 3/1987 | (DE) . |
| 37 30 862 | 3/1989 | (DE) . |
| 0 205 893 | 12/1986 | (EP) . |
| 2.124.748 | 9/1972 | (FR) . |
| 2.189.527 | 1/1974 | (FR) . |

OTHER PUBLICATIONS

*New Type Fatigue Phenomenon of Aluminum–Based Engine Bearings*, SAE Technical Paper Series, International Congress and Exposition (Feb. 27–Mar. 3, 1989); Authors: Yukio Ogita, Kosaburo Niwa & Yoshitaka Kondo.
International Search Report.

*Primary Examiner*—Deborah Jones
*Assistant Examiner*—Robert R. Koehler
(74) *Attorney, Agent, or Firm*—Darby & Darby

(57) ABSTRACT

A bimetallic strip for a sliding bearing having a sliding strip of an aluminum alloy which is adhered to a steel supporting strip and method of manufacture. The composition of the sliding strip is from 3 to 30% of tin; from 1 to 6% of silicon and the remainder being of aluminum and impurities, and the sliding strip has at least 95% of the silicon hard particles smaller than 3.5 microns and an aluminum grain average size of about 6 microns. The sliding strip is produced by roll casting the alloy and attaching the sliding strip to the steel supporting strip to form the bimetallic strip which is heat treated between 200° and 380° C. to obtain a metallurgical bonding between the strips; subjecting the bimetallic strip to a solubilizing process of the intermetallic compounds of the aluminum alloy by heating at 380–500° C., followed by cooling; and subjecting the bimetallic strip to a precipitation treatment at a temperature from 150° to 250° C. An interlayer can be provided between the sliding strip and support strip.

9 Claims, 3 Drawing Sheets

U.S. PATENT DOCUMENTS

| | | | |
|---|---|---|---|
| 3,268,369 | 8/1966 | Haugen | 428/653 |
| 4,471,029 | 9/1984 | Fukuoka et al. | 428/653 |
| 4,471,033 | 9/1984 | Fukuoka et al. | 428/653 |
| 4,696,867 | 9/1987 | Eastwood | 428/653 |
| 4,707,194 * | 11/1987 | Eastwood | 148/531 |
| 5,053,286 | 10/1991 | Pratt et al. | 428/653 |
| 5,365,664 | 11/1994 | Whitney, Jr. | 29/898.12 |
| 5,536,587 * | 7/1996 | Whitney, Jr. | 428/653 |

* cited by examiner

INVENTION

BIMETALLIC STRIP FOR A SLIDING BEARING AND PROCESS FOR PRODUCING SAID BIMETALLIC STRIP

FIELD OF THE INVENTION

The present invention refers to a bimetallic strip, which is used in the formation of sliding bearings for internal combustion engines and which comprises a strip, which is made of an anti-friction or sliding material in aluminum base alloy usually containing silicon, tin and copper and which is adhered to a steel supporting strip. The present invention is also related to a process for producing said bimetallic strip.

BACKGROUND OF THE INVENTION

The internal combustion engines have been designed to work with increasingly higher speeds and loads, thereby requiring sliding bearings, which are able to support these increasingly severer operational conditions, through improved fatigue resistance and anti-sticking characteristics, and which can operate with forged steel or cast iron crankshafts, without the need to protect the bimetallic strip with a lead/tin electrodeposited overlayer.

It is known that the high fatigue resistance characteristics of these aluminum base alloys result from a finer and more uniform distribution of the silicon particles in the aluminum phase.

Nevertheless, the known alloys of these type, such as that described in U.S. Pat. No. 4,696,867, still present a silicon particle distribution which, in spite of a possible addition of small amounts of strontium or sodium to said alloys, does not reach a desirable refining to obtain a load capacity compatible with the operational requirements of the modern internal combustion engines.

The grain size of the known alloys of this type is from about 20 to 50 $\mu$m, avoiding the achievement of substantial increases of fatigue resistance in the produced bimetallic strips (see FIG. 3 in the drawings). Besides de inconveniences cited above, it should be observed that the tin percentages of about 8% or more in the alloy composition do not allow said alloy, after its usual casting, to be hot rolled to the desired thickness for the sliding strip, because hot rolling these alloys presents the risk of the tin being squeezed out.

Another deficient aspect of the known solutions refers to the lack of treatment steps of the bimetallic strip, so as to obtain, in the sliding strip, a compound that is capable of hardening the aluminum alloy, increasing even more its fatigue resistance through a more accentuated silicon refining.

These prior art aluminum alloys are cast into billets with a shape which is very different from that to be attained by the sliding strip, thus making difficult and costly the manufacturing process of the bimetallic strip and the achievement of the minimum silicon refining in the alloy structure.

DISCLOSURE OF THE INVENTION

It is an objective of the present invention to provide a bimetallic strip for sliding bearings, which comprises an aluminum base alloy containing silicon and tin and which presents a structure with a high degree of silicon-tin refining, improved properties of fatigue resistance, anti-sticking and adherence to a supporting strip, without requiring the presence of strontium or sodium in the composition of the aluminum alloy and without leading to risks of the tin being squeezed out during the hot rolling steps of the sliding strip material.

Another objective of the invention is to provide a process which allows to obtain the above cited bimetallic strip in a economically feasible way.

BRIEF DESCRIPTION OF THE DRAWINGS

The invention will be described below, with reference to the attached drawings, in which.

BEST MODE FOR CARRYING OUT THE INVENTION

Figure 1:
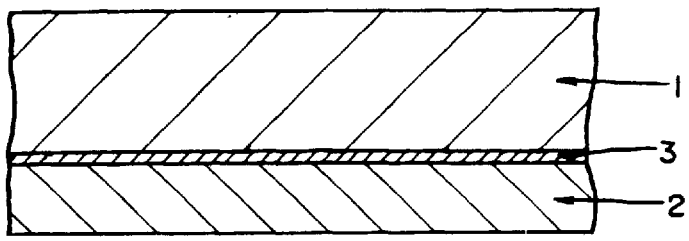
FIG. 1 is a sectional view of a length portion of a bimetallic strip of the type used in the present invention.
Figure 3:
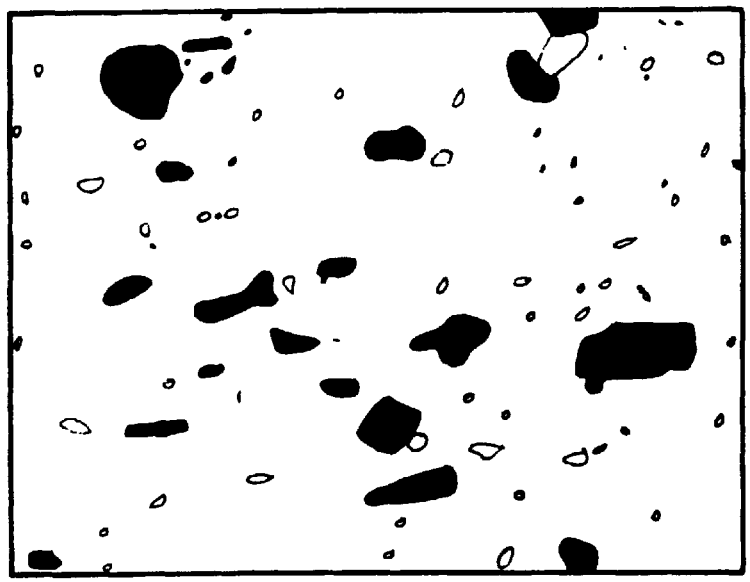
FIG. 3 is a metallographic representation of the sliding strip structure of a bimetallic strip produced in accordance with the prior art.

According to a first aspect of the invention with respect to FIG. 1, the bimetallic strip comprises a sliding strip 1, which is made of an aluminum base alloy, and which is adhered to a supporting strip 2 usually in steel, through a nickel coating layer 3 applied onto the supporting strip 2.

Figure 4:
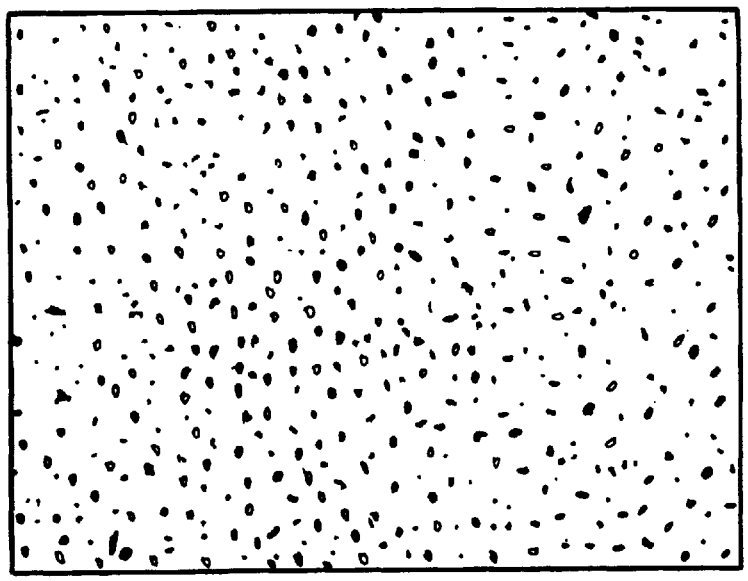
FIG. 4 is a metallographic representation similar to that of FIG. 3, but relative to the sliding strip of the bimetallic strip the present invention.

The aluminum alloy comprises from 3 to 30% of tin; from 1 to 6% of silicon and the remaining being of aluminum and accidental impurities. It has the shape of a strip, which is cast by quick solidification, with a thickness sligthly superior to that of the sliding strip 1 to be formed onto the supporting strip 2, said sliding strip 1 being structurally solubilized and artificially precipitated, in order to present an aluminum grain size of about 6 $\mu$m. This alloy has the silicon hard particles finely dispersed in the aluminum matrix, as illustrated in FIG. 4, at least 95% of said particles being smaller than 3.5 microns.

In a preferred composition, the alloy may further include at least one of the hardening elements: Ni, Mn, Cr, Cu and Ti, in the range from 0.05 to 5%, with the aim of increasing the mechanical properties and the wear, fatigue and sticking resistances.

In case the alloy is provided with one or more of the above additives, at least 95% of the silicon hard particles will be smaller than 3.5 microns and 5%, at maximum, will vary from 3.5 to 5 microns.

Figure 2:
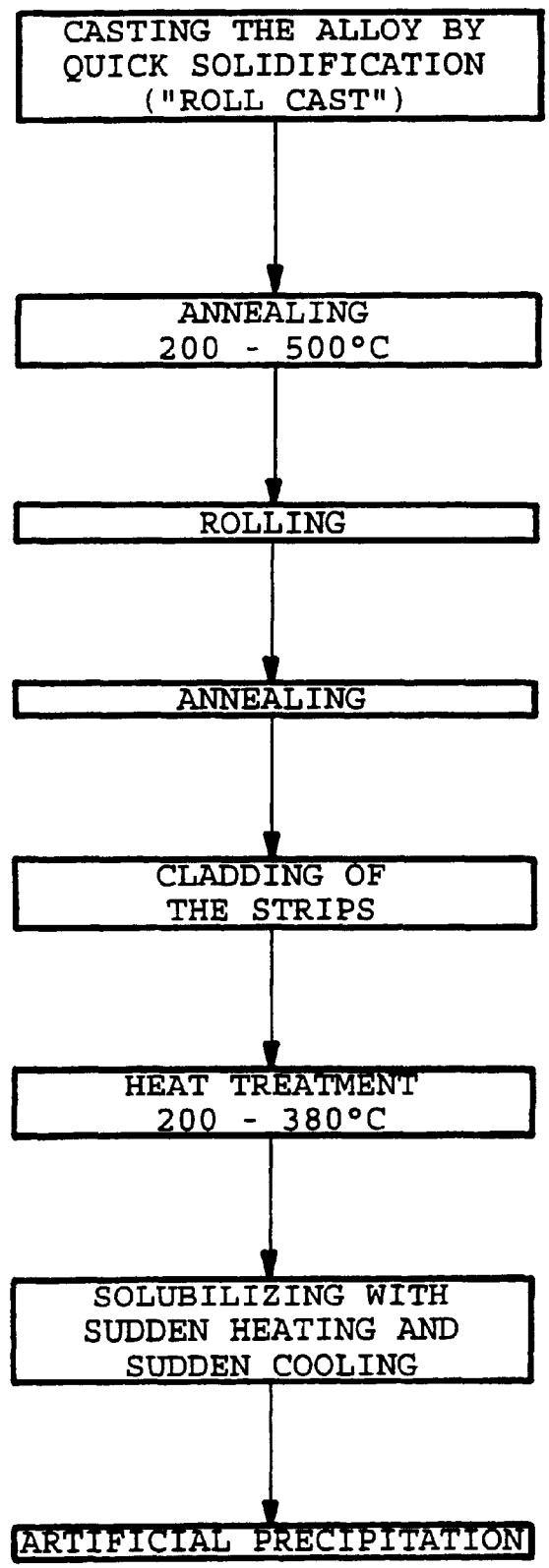
FIG. 2 is a block diagram, illustrating the steps of the manufacturing process of the bimetallic strip shown in FIG. 1.

According to a second aspect of the invention related to FIG. 2, the process for producing the above cited composite material comprises the following steps:

a—casting by the quick solidification process (roll cast) an alloy comprising from 3 to 30% of tin, from 1 to 6% of silicon, optionally from 0.05 to 5% of at least one of the hardening additives mentioned above and the remaining being of aluminum and accidental impurities, by pouring the cast alloy between two cold rolling cylinders.

b—annealing the aluminum alloy sliding strip 1 in a heater at a temperature range from 200 to 500° C.;

c—setting, optionally, the thickness of the sliding strip 1, through cold rolling passes, followed by respective annealings, as defined in the previous step;

d—hot rolling (cladding) together the sliding strip 1 and the steel supporting strip 2 coated with a nickel film 3, in order to form the bimetallic strip;

e—heat treating the bimetallic strip between 200 and 380° C., so as to obtain a metallurgical bonding between the strips;

f—subjecting the bimetallic strip to a solubilizing process of the intermetallic compounds of the aluminum alloy, by sudden heating at 380–500° C., followed by sudden cooling; and g—subjecting the bimetallic strip to an artificial precipitation treatment in a heater, at a temperature from 150 to 250° C.

The casting step by quick solidification (roll cast) allows the production of a sliding strip 1, which has been quickly solidified by the metallic bath and which has a reduced thickness, in milimeters, that is already very close to the thickness to be maintained in the final product. Said sliding strip further presents a quite refined structure, mainly in terms of silicon and tin dispersion in the aluminum phase. The refining of the hard particles, i.e., silicon and silicon compounds, reaches a level in which 100% of the particles are smaller than 3.5 microns. Optionally, the alloy may contain the above cited hardening additive elements and have the dimension of the hard particles controlled, in order to obtain 95% of the particles smaller than 3.5 microns and the remaining 5% varying from 3.5 to 5 microns. Thus, it is possible to initiate the manufacture of a product which is more resistant to fatigue and sticking than those known products, by using an aluminum alloy containing silicon, tin and copper, but without strontium or sodium, which the prior art considers as adequate for better refining the structure of this kind of alloy.

Another unexpected effect in the alloy structure, in function of the casting process, is that the sliding strip 1 may be hot rolled at high temperatures, without the tin being squeezed out, even when said tin is found in porcentages higher than 8%.

The solubilizing step may be achieved, by said bimetallic strip being subjected to a liquid bath, such as a lead bath, said bimetallic strip being then subjected to sudden cooling through jets of water, for example. This treatment promotes a substantial increase in the load capacity of the bimetallic strip to be produced.

The artificial precipitation is made in heaters, whereto the coils are fed in a discontinuous way.

The bimetallic strip may then be shaped for producing the sliding bearing.

Another unexpected aspect of the invention resides in the fact that the average size of the aluminum grain, corresponding to 50 microns in the prior art, is reduced to about 6 microns in the new sliding strip 1, which is obtained by roll cast or hot cladding.

Figure 5:
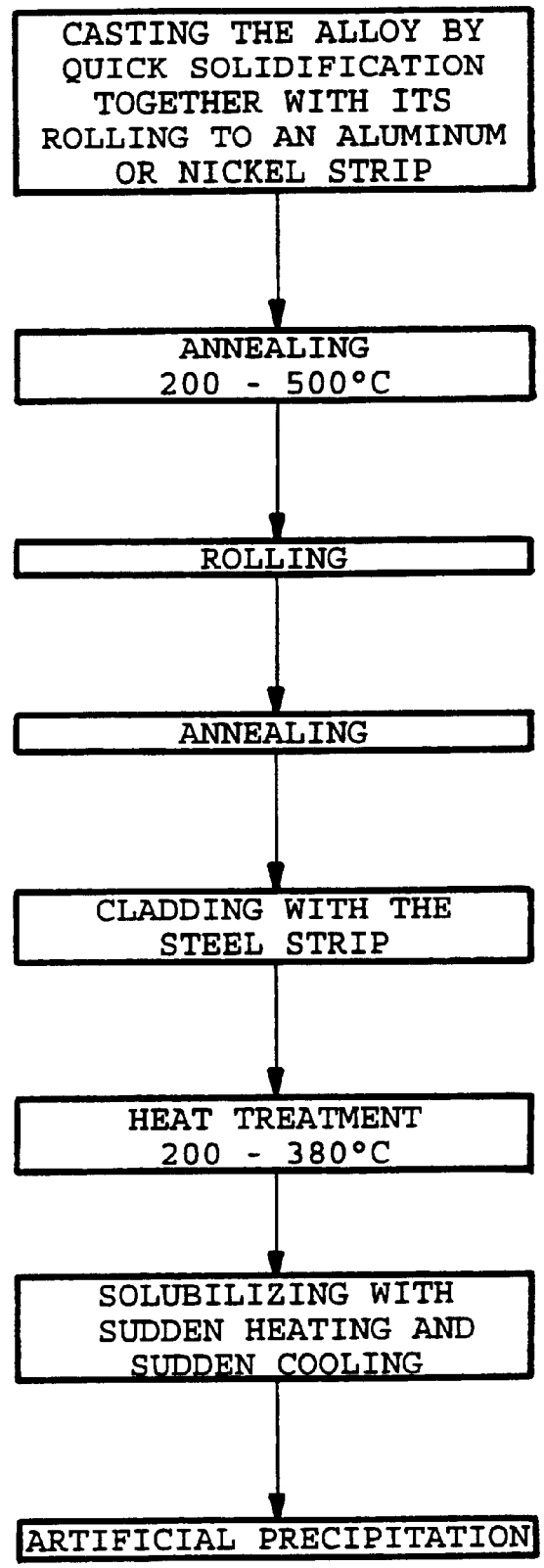
FIG. 5 is a block diagram, illustrating the steps in the manufacturing process of the bimetallic strip including an aluminum interlayer.

FIG. 5 illustrates a variant of the process, in which there is provided a nickel or aluminum interlayer, onto which a sliding strip is formed and rolled, the latter being obtained by quick solidification.

What is claimed is:

1. A bimetallic strip for a sliding bearing, comprising a sliding strip of an aluminum alloy which is adhered to a supporting strip of steel wherein the composition of the sliding strip is from about 3 to 30% of tin; from about 1 to 6% of silicon and the remainder being of aluminum and impurities, said sliding strip having at least 95% of the silicon hard particles smaller than 3.5 microns and an aluminum grain average size of about 6 microns.

2. A bimetallic strip, as in claim 1, wherein the aluminum alloy of the sliding strip further includes, by weight, from 0.05 to 5% of at least one hardening element selected from the group consisting of Ni, Mn, Cr, Cu and Ti, said alloy having at least 95% of the silicon hard particles and hardening additive elements smaller than 3.5 microns and not more than 5% varying from 3.5 to 5 microns.

3. A bimetallic strip, as in claim 1 further comprising an interlayer between the sliding strip and the supporting strip.

4. Process for producing a bimetallic strip for a sliding bearing comprising an aluminum alloy sliding strip adhered to a supporting strip of steel comprising the steps of:

a—roll casting a sliding strip of an alloy comprising from 3 to 30% of tin, from 1 to 6% of silicon and the remainder of aluminum and impurities to obtain at least 95% of the silicon particles smaller than 3.5 microns and an aluminum grain average size of about 6 microns;

b—annealing the aluminum alloy at a temperature from 200 to 500° C.;

c—attaching the sliding strip to a steel supporting strip;

d—subjecting the bimetallic strip to a solubilizing process of the intermetallic compounds of the aluminum alloy by heating at 380–500° C., followed by cooling; and e—subjecting the bimetallic strip to an artificial precipitation treatment at a temperature from 150 to 250° C.

5. Process, as in claim 4, wherein the sliding strip cast in step a—comprises from 0.05 to 5% of at least one additive hardening element selected from the group consisting of Ni, Mn, Cr, Cu and Ti.

6. Process, as in claim 5, wherein the sliding strip has at least 95% of the silicon particles and additive hardening elements smaller than 3.5 microns and not more than 5% varying from 3.5 to 5 microns.

7. Process, as in claim 4 wherein the sliding strip is roll cast with an aluminum or nickel strip interlayer between the sliding strip and the supporting strip.

8. A bimetallic strip as in claim 3 wherein said interlayer is of a material selected from the group consisting of aluminum and nickel.

9. Process as in claim 4 further comprising after the annealing step b—the step of rolling the sliding strip to a desired thickness and annealing the rolled strip.

* * * * *